(12) United States Patent
Won et al.

(10) Patent No.: US 8,031,291 B2
(45) Date of Patent: Oct. 4, 2011

(54) LIQUID CRYSTAL DISPLAY AND TABLET COMPUTER HAVING A CHASSIS FASTENING MEMBER THAT RECEIVES A PRINTED CIRCUIT BOARD

(75) Inventors: Joo Yeon Won, Seoul (KR); Sang Hoon Park, Yongin (KR); Jae Chang Choi, Yongin (KR); Young Joo Nam, Daegu (KR)

(73) Assignee: Samsung Electronics Co., Ltd. (KR)

( * ) Notice: Subject to any disclaimer, the term of this patent is extended or adjusted under 35 U.S.C. 154(b) by 652 days.

(21) Appl. No.: 12/070,243

(22) Filed: Feb. 15, 2008

(65) Prior Publication Data

US 2008/0218655 A1 Sep. 11, 2008

(30) Foreign Application Priority Data

Feb. 15, 2007 (KR) .......................... 10-2007-0016071

(51) Int. Cl.
*G02F 1/1333* (2006.01)
*G02F 1/1345* (2006.01)

(52) U.S. Cl. .............................. 349/60; 349/58; 349/150
(58) Field of Classification Search .................... 349/58, 349/60, 150
See application file for complete search history.

(56) References Cited

U.S. PATENT DOCUMENTS

| 6,972,963 | B1 * | 12/2005 | Chou | ............................ 361/760 |
| 2003/0234894 | A1 * | 12/2003 | Lee | ................................. 349/58 |
| 2005/0185111 | A1 * | 8/2005 | Matsuoka | ....................... 349/58 |

* cited by examiner

*Primary Examiner* — David Nelms
*Assistant Examiner* — Lauren Nguyen
(74) *Attorney, Agent, or Firm* — Innovation Counsel LLP

(57) ABSTRACT

The present invention relates to a liquid crystal display and a tablet computer having the same. According to the present invention, there is provided a liquid crystal display, comprising: a liquid crystal display panel for displaying an image; a driving circuit unit connected to the liquid crystal display panel and including a printed circuit board mounted with a circuit component; a top chassis disposed over the liquid crystal display panel; and a fastening member for fastening the printed circuit board of the driving circuit unit to the top chassis.

13 Claims, 10 Drawing Sheets

LIQUID CRYSTAL DISPLAY AND TABLET COMPUTER HAVING A CHASSIS FASTENING MEMBER THAT RECEIVES A PRINTED CIRCUIT BOARD

This application claims the benefit of priority of Korean Patent Application No. 10-2007-0016071 filed on Feb. 15, 2007.

BACKGROUND OF THE INVENTION

1. Field of the Invention

The present invention relates to a liquid crystal display and a tablet computer having the same.

2. Description of the Related Art

A liquid crystal display (LCD) displays an image on a liquid crystal display panel by controlling the light transmissivity of individual picture elements in response to image signals applied to a plurality of control switches arranged in a matrix form. LCD displays are very widely used because of their superior features such as lightweight, slim structure, low power consumption, full-color, and high resolution. Currently, LCD displays are used in devices such as computers, tablet personal computers, notebook computers, PDAs, portable phones, and television sets.

As the demand for ultra-thin tablet personal computers has recently increased, several studies have been undertaken in the technology of manufacturing such computers. However, the manufacturing cost of an ultra-thin tablet personal computer increases since the number of processes and necessary components for making a tablet personal computer increases as the computer is made thinner or ultra-thin.

SUMMARY OF THE INVENTION

The present invention provides a liquid crystal display, which makes it possible to implement an ultra-thin tablet computer, and a tablet computer having the same.

According to an aspect of the present invention, there is provided a liquid crystal display, including: a liquid crystal display panel for displaying an image; a driving circuit unit connected to the liquid crystal display panel and including a printed circuit board with a circuit component mounted thereon; a top chassis disposed over the liquid crystal display panel; and a fastening member for fastening the printed circuit board of the driving circuit unit to the top chassis.

The liquid crystal display may further include a backlight unit for providing light to the liquid crystal display panel; a digitizer for inputting location coordinates; and a mold frame having first and second receiving spaces formed therein, the liquid crystal display panel and the backlight unit being accommodated in the first receiving space, and the digitizer and the printed circuit board being accommodated in the second receiving space.

The digitizer may be disposed between the mold frame and the printed circuit board.

The driving circuit unit may further include a flexible printed circuit board for connecting the printed circuit board and the liquid crystal display panel, and the flexible printed circuit board may be bent along a side wall of the mold frame so that the printed circuit board is disposed on the digitizer.

The fastening member may include a body portion; a first fastening portion formed in the body portion; and a second fastening portion formed in the body portion to be spaced apart from the first fastening portion.

The top chassis may include a coupling portion, and the printed circuit board includes a base plate on which the circuit component is mounted and a protruding portion formed on a side of the base plate.

The first fastening portion of the fastening member may be fastened to the protruding portion of the printed circuit board and the second fastening portion may be fastened to the coupling portion of the top chassis.

The first fastening portion of the fastening member may be formed in the shape of a groove, the second fastening portion may be formed in the shape of a groove or through hole, and the coupling portion of the top chassis may be formed in the shape of a protrusion.

The coupling portion of the top chassis may be formed in the shape of a protrusion and both ends of the protrusion may be perforated, that is to say, a hole may be formed in each end of the coupling portion protrusion.

The first fastening portion of the fastening member may be formed in the shape of a groove, the second fastening portion may be formed in the shape of a protrusion, and the coupling portion of the top chassis may be formed in the shape of a through hole.

The first fastening portion of the fastening member may be formed in the shape of a groove, the second fastening portion may be formed in the shape of a groove or through hole, and the coupling portion of the top chassis may be formed in the shape of a through hole, the liquid crystal display further including a fixing portion to be inserted into the second fastening portion and the coupling portion and to be fixed thereto.

The body portion of the fastening member may include a first body and a second body bent from the first body, the first fastening portion may be formed in the first body, and the second fastening portion may be formed in the second body.

The fastening member may be made of a non-conductive elastic material.

According to another aspect of the present invention, there is provided a tablet computer, including: a liquid crystal display including a liquid crystal display panel for displaying an image, a driving circuit unit connected to the liquid crystal display panel and including a printed circuit board having a circuit component mounted thereon, a top chassis disposed over the liquid crystal display panel, and a fastening member for fastening the printed circuit board of the driving circuit unit to the top chassis; a front case for receiving the liquid crystal display; and a fixing member for fixing the top chassis of the liquid crystal display to the front case.

The top chassis may include a coupling portion, the printed circuit board includes a base plate on which the circuit component is mounted and a protruding portion formed on a side of the base plate, and the fastening member may be fastened to the coupling portion of the top chassis and the protruding portion of the printed circuit board.

The fastening member may include a body portion, a first fastening portion formed in the body portion, and a second fastening portion formed in the body portion to be spaced apart from the first fastening portion; and the first fastening portion may be fastened to the protruding portion of the printed circuit board and the second fastening portion may be fastened to the coupling portion of the top chassis.

The coupling portion of the top chassis may be a protrusion formed so that both ends thereof are perforated by a hole formed in each end, the front case may have a fastening hole formed therein, and the fixing member may be inserted in the fastening hole of the case and the coupling portion of the top chassis.

The tablet computer may further include a backlight unit for providing light to the liquid crystal display panel; a digitizer for inputting display panel location coordinates; and a mold frame having first and second receiving spaces formed therein, the liquid crystal display panel and the backlight unit being accommodated in the first receiving space, and the digitizer and the printed circuit board being accommodated in the second receiving space.

The digitizer may be disposed between the mold frame and the printed circuit board.

The driving circuit unit may further include a flexible printed circuit board for connecting the printed circuit board and the liquid crystal display panel, and the flexible printed circuit board may be bent along a sidewall of the mold frame and disposed on the digitizer.

The fastening member may be made of a non-conductive elastic material.

BRIEF DESCRIPTION OF THE DRAWINGS

The above and other aspects, features and advantages of the present invention will become apparent from the following description of preferred embodiments given in conjunction with the accompanying drawings, in which.

DETAILED DESCRIPTION OF THE PREFERRED EMBODIMENT

Hereinafter, preferred embodiments according to the present invention will be described in detail with reference to the accompanying drawings.

Figure 1:
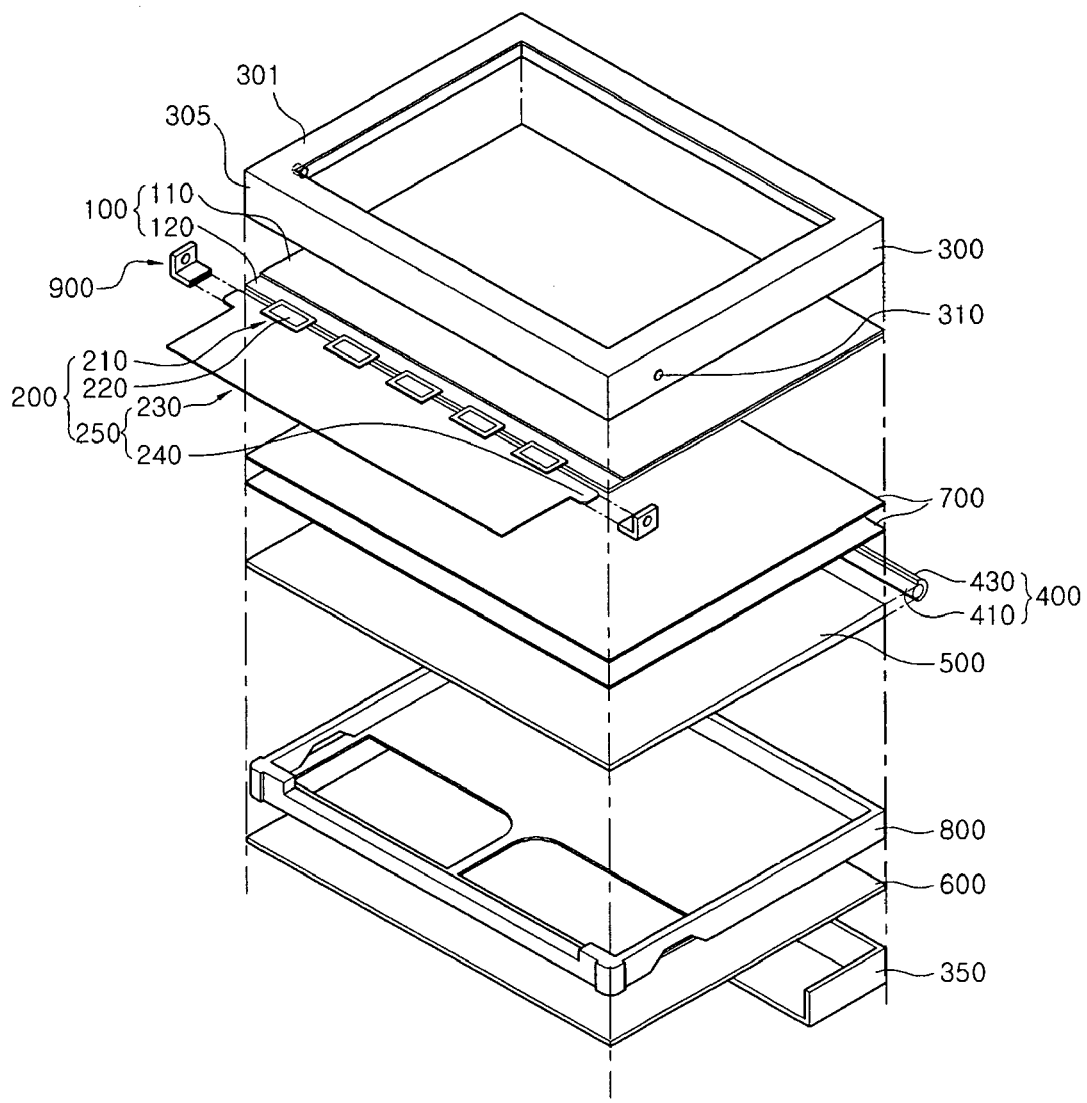
FIG. 1 is an exploded perspective view of a liquid crystal display according to an embodiment of the present invention.
Figure 2:
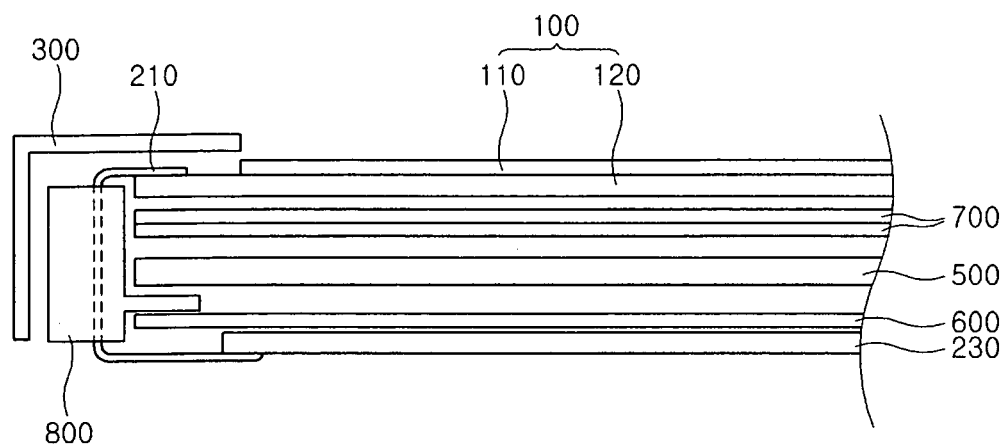
FIG. 2 is a sectional view of the liquid crystal display shown in FIG. 1.

FIG. 1 is an exploded perspective view of a liquid crystal display according to the embodiment of the present invention, and FIG. 2 is a sectional view of the liquid crystal display shown in FIG. 1.

Referring to FIGS. 1 and 2, the liquid crystal display includes a liquid crystal display panel 100, a driving circuit unit 200, a top chassis 300, a back cover 350, a light source unit 400, a light guide plate 500, a digitizer 600, optical sheets 700, a mold frame 800 and fastening members 900.

The liquid crystal display panel 100 includes a color filter substrate 110 and a thin film transistor (TFT) substrate 120. The color filter substrate 110 is a substrate on which RGB filters displaying a predetermined color when light passes therethrough are formed through a thin film process. A common electrode made of transparent conductor such indium tin oxide (ITO), indium zinc oxide (IZO) or the like is formed on an entire surface of the color filter substrate. The TFT substrate 120 is a transparent glass substrate on which TFTs are formed in a matrix form. In each TFT, a data line is connected to a source terminal, a gate line is connected to a gate terminal, and a pixel electrode, which is a transparent electrode made of transparent conductive material, is connected to a drain terminal. Accordingly, when an electric signal is applied to the gate line, the TFT is turned on, so that an electric signal required for forming an image is applied to the drain terminal and the associated pixel electrode. Once the TFT is turned-on, an electric field is formed between the pixel electrode of the TFT substrate and the common electrode of the color filter substrate. Due to this electric field, the arrangement of liquid crystal material interposed between the TFT substrate and the color filter substrate is changed and the light transmissivity is changed according to the changed arrangement, thereby displaying the desired image.

In order to drive the liquid display panel 100, the driving circuit unit 200 serves to apply a gate signal to the gate line of the liquid display panel 100 and a data signal to the data line.

The driving circuit unit 200 includes a flexible printed circuit board 210, driving integrated circuits (ICs) 220 and a printed circuit board 250.

The printed circuit board 250 includes a base plate 230 on which various kinds of circuit components are mounted and protruding portions 240 formed at both sides of the base plate 230. The circuit components required for driving the liquid crystal display panel including a control IC, such as a DC-DC converter circuit for generating various kinds of voltages, a gamma reference voltage generator for outputting a gray scale voltage and the like, are mounted to the base plate 230 of the printed circuit board. The protruding portions 240 are fastened to first fastening portions 920 (see FIGS. 3A to 3C) of the fastening members 900, which will be described below. The protruding portions 240 may be formed integrally with the base plate 230.

The flexible printed circuit board 210 electrically connects the printed circuit board 250 and the TFT substrate 120 of the liquid crystal display panel 100. The driving ICs 220 are mounted to the flexible printed circuit board 210, so that RGB (read, green and blue) signals generated in the printed circuit board 250, electric power and the like are transmitted to the liquid crystal display panel 100. Although a tape-automated bonding (TAB) mounting method is employed in the embodiment of the present invention, a chip on glass (COG) mounting method in which the driving IC 220 is not mounted on the flexible printed circuit board 210 but mounted on a thin film transistor substrate may alternatively be employed.

Figure 6A:
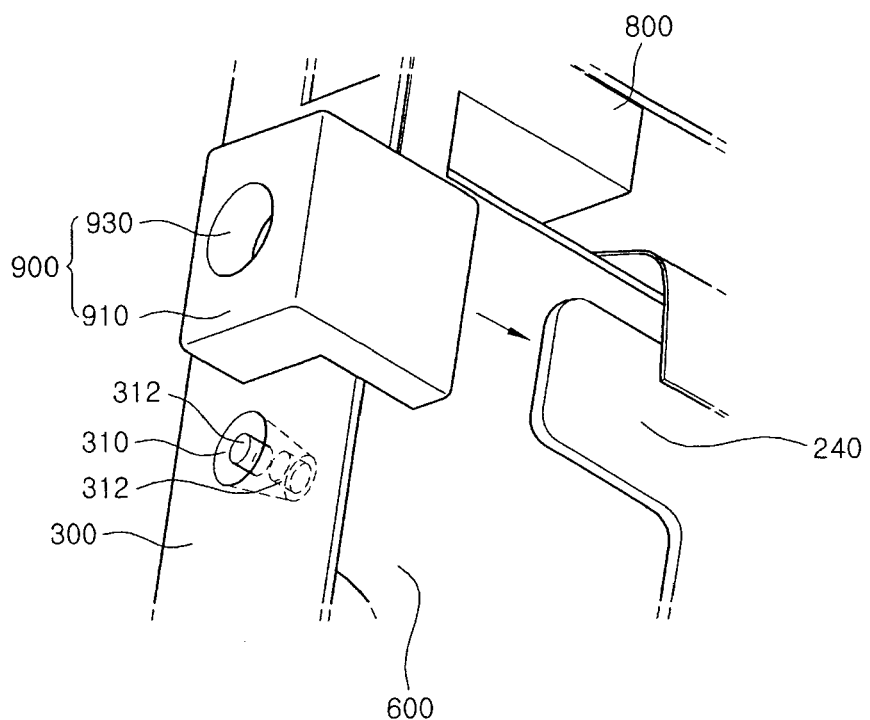
FIGS. 6A to 6C are perspective views showing a process of fastening the printed circuit board to the top chassis.

The top chassis 300, which is formed in the shape of a rectangular frame, includes a plane portion 301 and side wall portions 305 bent at a right angle from the plane portion 301. The plane portion 301 of the top chassis overlaps the edges of the liquid crystal display panel 100 and the driving circuit unit 200 to retain them in place and to protect them against an external shock. Coupling portions 310 are formed on two of the side wall portions 305 of the top chassis 300. Each of the coupling portions 310 may be formed in the shape of a protrusion. That is, the coupling portion 310 protrudes inwardly, i.e., into the space in which the liquid crystal display panel 100 is accommodated. The coupling portions 310 may be formed integrally with the side wall portions 305 of the top chassis 300, and each of the coupling portions 310 may have a hole 312 formed in each of the ends thereof, as shown in FIG. 6A. In a process of manufacturing the top chassis 300, a portion of the side wall portion 305 can be made to protrude by partially pressing the side wall portion 305 of the top chassis 300, to thereby form the coupling portion 310.

The light source unit 400 includes a lamp 410 and a lamp reflector 430. A cold cathode fluorescent lamp or an external electrode fluorescent lamp may be used as the lamp 410. Although the lamp 410 may be formed in a linear shape as shown in the figure, the lamp is not limited to that shape. The lamp reflector 430 reflects light radially emitted from the lamp 410 to the light guide plate 500. Then the light exits from the light guide plate 500 towards the display panel to maximize the light use efficiency. Although the lamp is used as the light source utilized in the light source unit 400 in this embodiment, the present invention is not limited thereto. That is, various kinds of light sources, such as the light emitting diode, may be used.

The light guide plate 500 is coupled with the lamp reflector 430. With the light guide plate, the distribution of light from the linear shaped light source unit 400 is converted into that of a surface light source. The optical sheets 700 are disposed over the light guide plate 500 to make the distribution of light emitted from the light guide plate 500 more uniform in intensity.

The digitizer 600 reads the two-dimensional location coordinates, X-Y, of the location of a stylus pen on the display screen. The digitizer 600 converts location coordinates, of the stylus pen on the liquid crystal display panel 100, into an electric signal. The digitizer 600 decomposes an image written on the screen, be it a picture, a line of text or the like into electronic bits and stores them in a computer, and replays the stored data to display the original image. The digitizer 600 is connected to the driving circuit unit 200 for driving the liquid crystal display panel 100 and displays the input location coordinate converted into the electric signal on the liquid crystal display panel 100.

The mold frame 800 has a first receiving space and a second receiving space formed therein. The first receiving space is an upper receiving space facing the liquid crystal display panel 100. And the second receiving space is a lower receiving space facing the back cover 350. A backlight unit, including the light source unit 400, the light guide plate 500, and the optical sheet 700 and the liquid crystal display panel 100 are accommodated in the first receiving space of the mold frame 800. The digitizer 600 and the printed circuit board 250 of the driving circuit unit 200 are accommodated in the second receiving space. The flexible printed circuit board 210 of the driving circuit unit 200 is bent along a sidewall of the mold frame 800, so that the printed circuit board 250, connected to one end of the flexible printed circuit board 210, is disposed in the second receiving space of the mold frame 800. The digitizer 600 is first disposed in the second receiving space of the mold frame 800, and the printed circuit board 250 is disposed under the digitizer 600 (see FIG. 2). That is, the digitizer 600 is disposed between the mold frame 800 and the printed circuit board 250.

The fastening members 900 fix the printed circuit board 250 of the driving circuit unit 200 to the liquid crystal display. The fastening members 900 are fastened to the coupling portions 310 of the top chassis 300 and the protruding portions 240 of the printed circuit board 250, respectively. That is, the protruding portions 240 of the printed circuit board 250 are inserted into the fastening members 900 to be fixed thereto and the fastening members 900 are fastened to the coupling portions 310 of the top chassis 300 to be fixed thereto, respectively, whereby the printed circuit board 250 is fixed to the top chassis 300. The fastening member 900 may be made of a non-conductive elastic material such as silicon rubber. The configuration and fastening structure of the fastening member 900 will be described in detail below.

The back cover 350 is installed under the mold frame 800 and supports the digitizer 600.

Figure 3A:
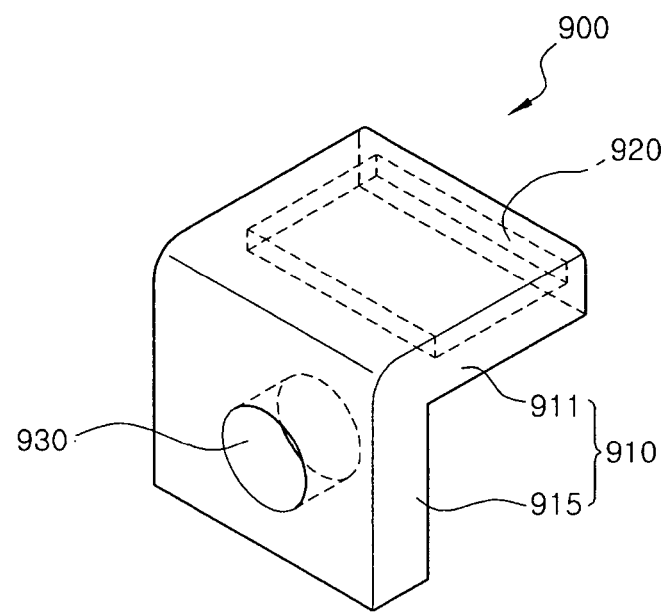
FIGS. 3A to 3C are schematic perspective views and a sectional view of a fastening member for fastening a printed circuit board of the liquid crystal display to a top chassis.
Figure 3B:
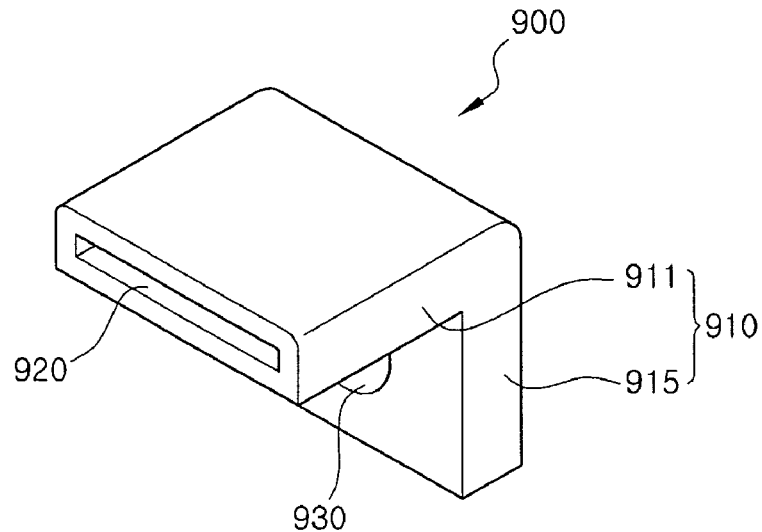
Figure 3C:
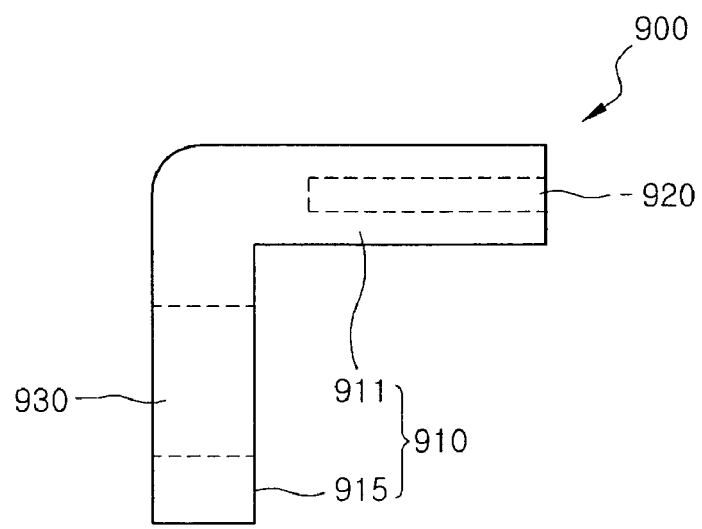
Figure 4A:
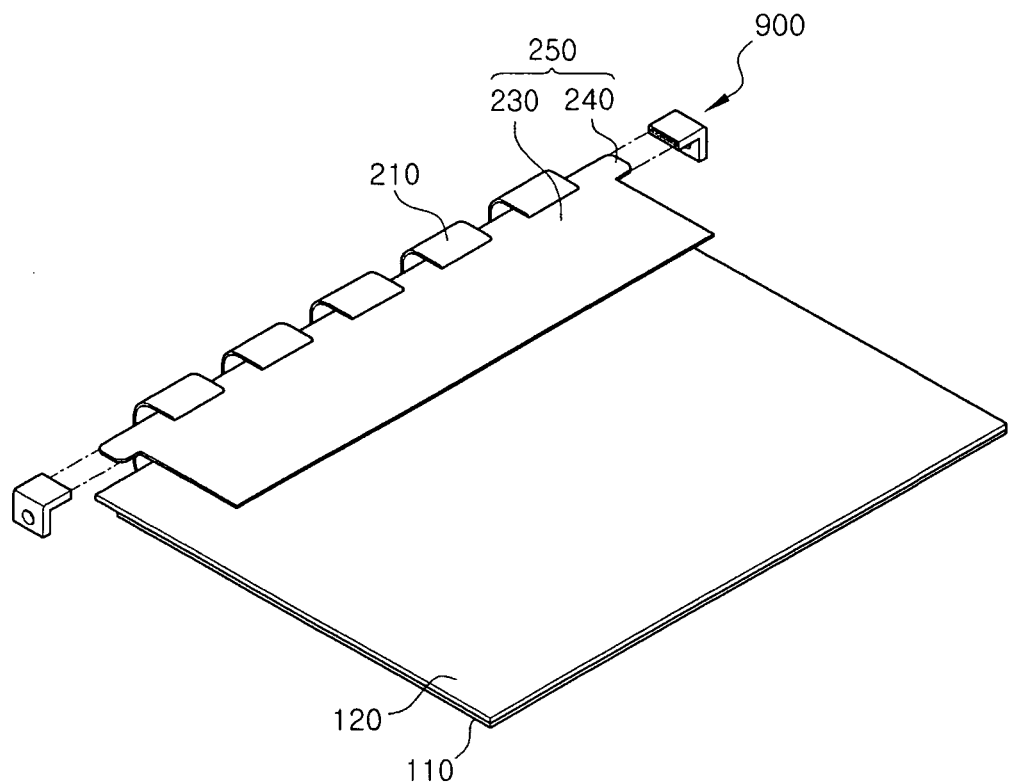
FIGS. 4A and 4B are a schematic perspective view and a partial enlarged view of the liquid crystal display, wherein the fastening member is not yet fastened to the printed circuit board.
Figure 4B:
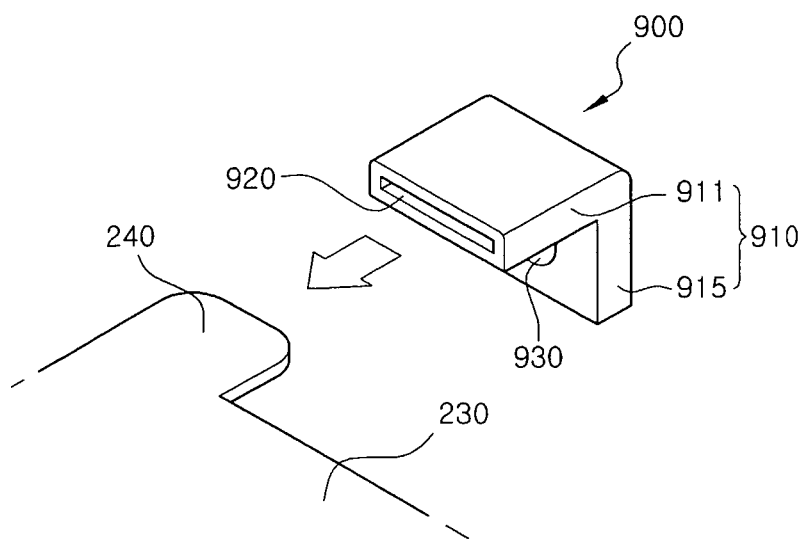

FIGS. 3A to 3C are schematic perspective views and a sectional view of the fastening member for fastening the printed circuit board of the liquid crystal display with the top chassis, and FIGS. 4A and 4B are a schematic perspective view and a partial enlarged view of the liquid crystal display, wherein the fastening member is not yet fastened with the printed circuit board.

Referring to FIGS. 3A to 3C, the fastening member 900 includes a body portion 910, a first fastening portion 920 and a second fastening portion 930.

The body portion 910 includes a first body 911 and a second body 915 bent from the first body 911. The first fastening portion 920 is formed in the first body 911, and the second fastening portion 930 is formed in the second body 915. The first fastening portion 920 is formed in the shape of a groove, and the second fastening portion 930 may be formed in the shape of a through hole.

The first fastening portion 920 of the fastening member 900 is formed corresponding to the shape and size of the protruding portion 240 so that the protruding portion 240 formed at both sides of the base plate 230 of the printed circuit board 250 is inserted into the first fastening portion 920 (see FIGS. 4A and 4B). Also, the second fastening portion 930 of the fastening member 900 is formed corresponding to the shape and size of the coupling portion 310 so that the protrusion-shaped coupling portion 310 (see FIG. 5) formed on the sidewall of the top chassis 300 may be inserted into the second fastening portion 930.

Although the body portion 910 includes the first body 911 and the second body 915 forming generally an "L" shape in this embodiment, the shape of the body portion 910 is not limited to an "L" shape. That is, the body portion may be formed in various shapes, for example, a hexahedral shape (see FIG. 7).

The fastening member 900 is made of a non-conductive elastic material such as silicon rubber. The digitizer 600 may malfunction when it is brought into contact with metallic materials. Accordingly, it is preferred that the fastening member which can possibly come in contact with the digitizer 600 be made of a non-conductive and elastic material to prevent malfunction of the digitizer 600.

Figure 5:
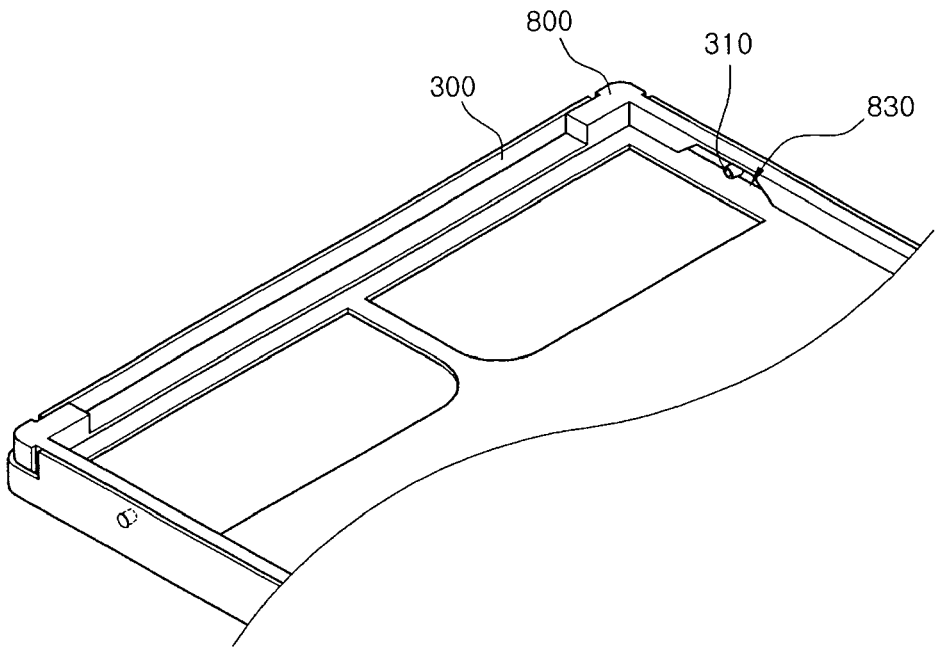
FIG. 5 is a rear perspective view of a mold frame and the top chassis of the liquid crystal display according to the embodiment of the present invention.

FIG. 5 is a rear perspective view of the mold frame and the top chassis of the liquid crystal display according to the embodiment of the present invention. FIG. 5 shows the mold frame 800 and the top chassis 300 of the liquid crystal display which are fastened together.

The coupling portions 310 are formed to inwardly protrude at two sidewalls of the top chassis 300. The coupling portions 310 are formed integrally with the top chassis 300. In this embodiment, each end of the coupling portions 310 may be formed with a hole therein. However, the shape of the coupling portion 310 is not limited to coupling portions having holes. In a region of the mold frame 800 corresponding to a position of the coupling portion 310, a receiving portion 830 is formed by removing a portion of a sidewall of the mold frame 800 in order to accommodate the fastening member 900.

Figure 6B:
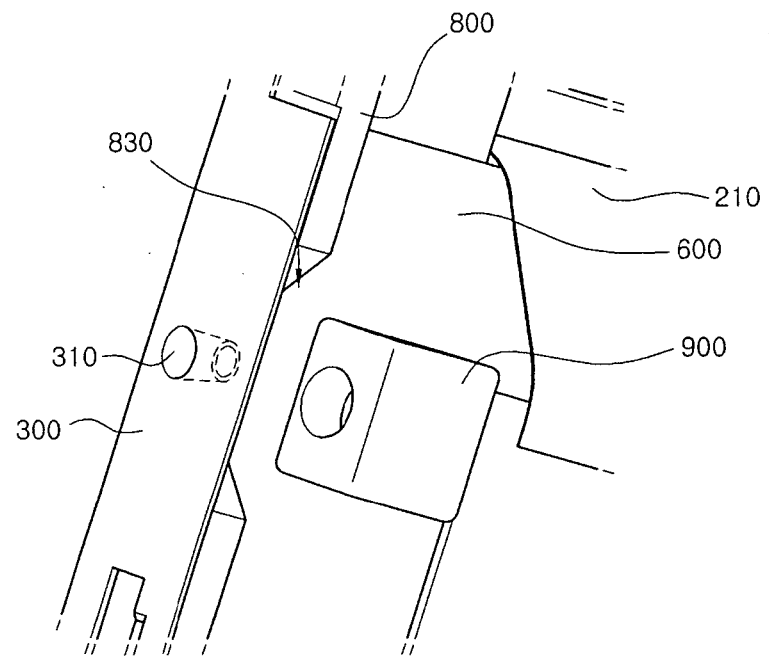
Figure 6C:
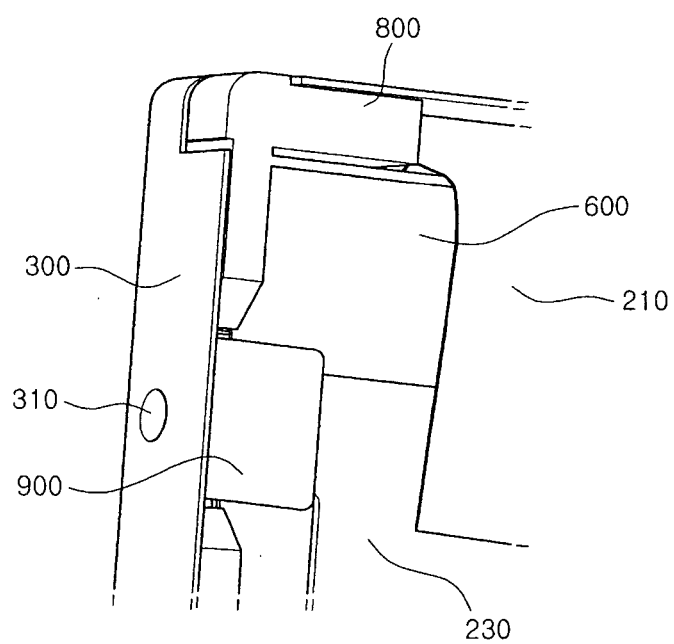

FIGS. 6A to 6C are perspective views showing a process of fastening the printed circuit board to the top chassis.

Referring to FIGS. 6A to 6C, the first fastening portions 920 of the fastening members 900 are aligned with the protruding portions 240 of the printed circuit board 250. And then, the protruding portions 240 of the printed circuit board 250 are inserted into and fastened to the first fastening portions 920 formed in a shape of a groove (see FIG. 6A).

Next, the second fastening portions 930 of the fastening members 900 are engaged with the protrusion-shaped coupling portions 310 of the top chassis 300 and fixed thereto (see FIGS. 6B and 6C).

With the printed circuit board 250 fixed to the top chassis 300 by means of the fastening members 900, and with the fastening members 900 made of non-conductive elastic material, as in this embodiment of the present invention, malfunction of the digitizer 600 is prevented when the fastening member 900 is brought into contact with the digitizer 600. In addition, since the fastening members 900 absorb shocks and vibrations, the possibility that the printed circuit board is damaged by an externally applied shock or vibration is remarkably reduced.

Figure 7:
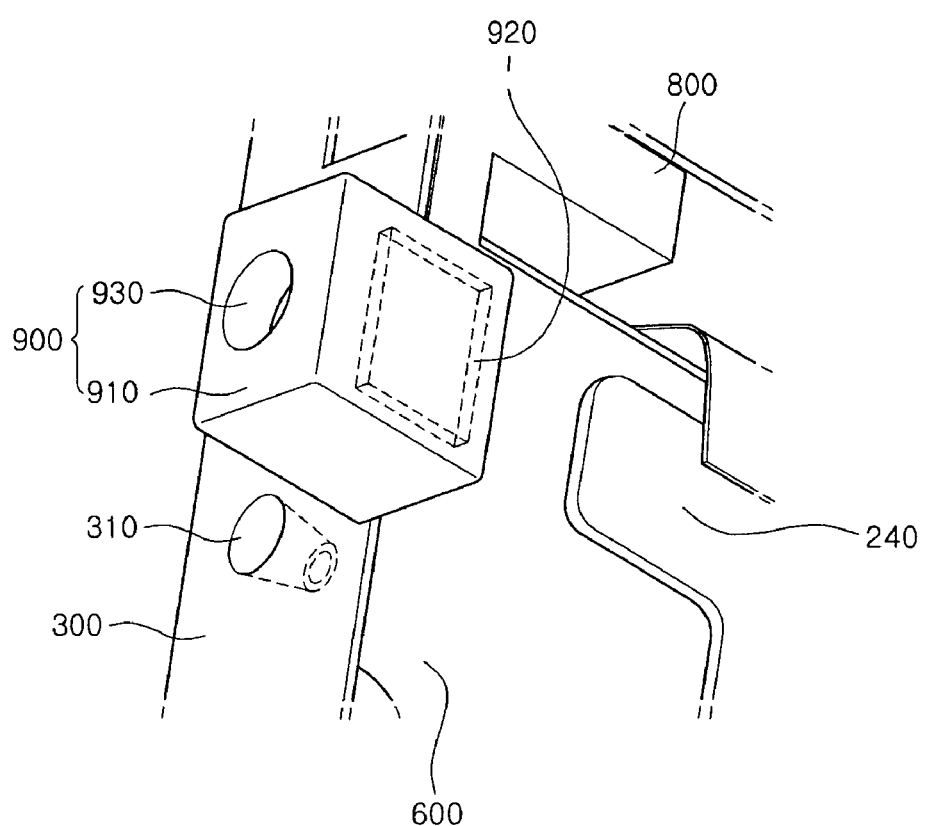
FIGS. 7 to 9 are views showing modified examples of the fastening member of the liquid crystal display according to the present invention.
Figure 8:
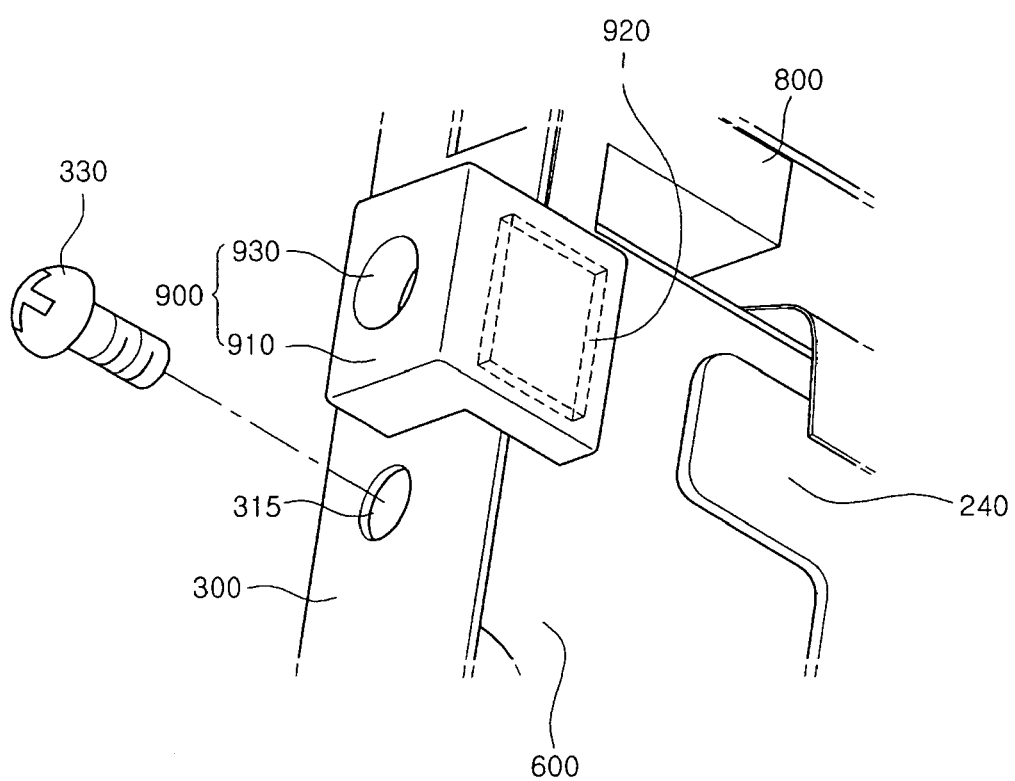
Figure 9:
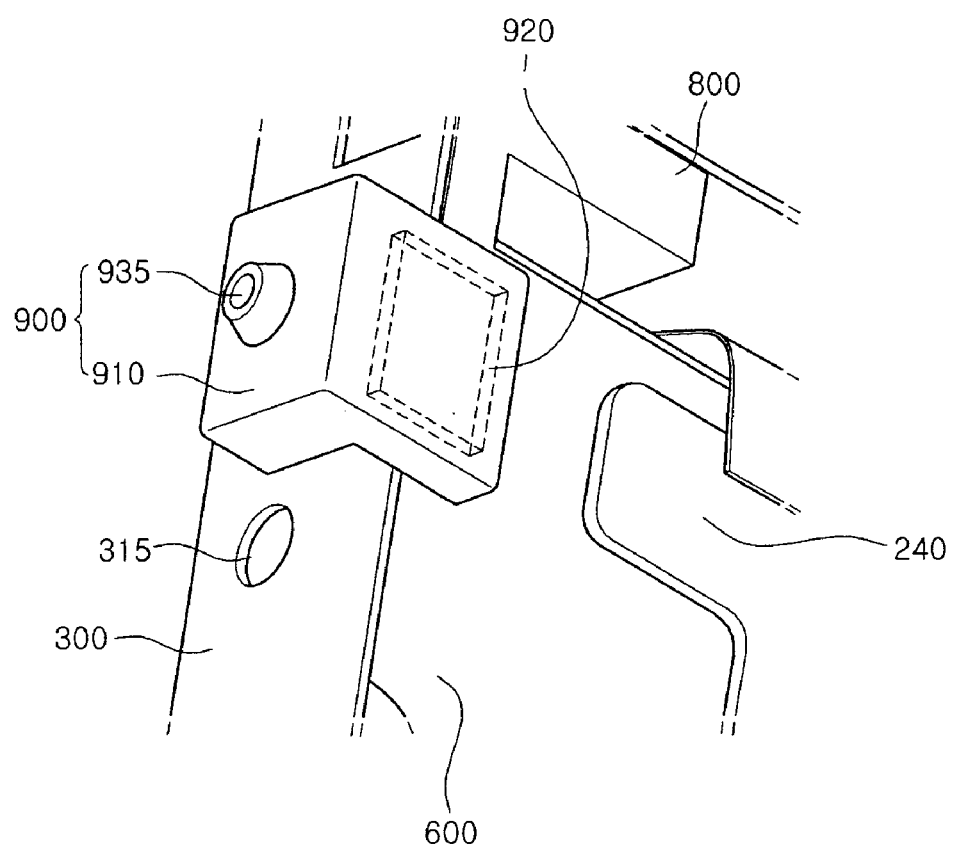

FIGS. 7 to 9 show exemplary modifications of the fastening member of the liquid crystal display of the present invention.

Referring to FIG. 7, a fastening member 900 includes a body portion 910, a first fastening portion 920 and a second fastening portion 930. The body portion 910 is formed in a generally rectangular parallelepiped shape. The first fastening portion 920 is formed in a first side of the body portion 910 and the second fastening portion 930 is formed in a second side opposite to the first side. The first fastening portion 920 is formed in the shape of a groove corresponding to a protruding portion 240 of a printed circuit board 250, and the second fastening portion 930 is formed in the shape a blind hole or a through hole corresponding to the shape and the size of a protrusion-shaped coupling portion 310 formed on a sidewall of a top chassis 300.

Referring to FIG. 8, a fastening member 900 includes a body portion 910 generally formed in an "L" shape, a first fastening portion 920 and a second fastening portion 930. The first fastening portion 920 is formed in the shape of a groove in a first side of the body portion 910, and the second fastening portion 930 is formed in the shape of a through hole in a second side of the body portion 910.

A coupling portion 315 is formed in a sidewall of a top chassis 300. The coupling portion 315 is formed in the shape of a through-hole.

A protruding portion 240 of a printed circuit board 250 is inserted into the first fastening portion 920 of the fastening member 900, and a fixing portion 330 is inserted into the second fastening portion 930 and the coupling portion 315 of the top chassis 300 to be fixed. A screw or the like may be used as the fixing portion 330.

Referring to FIG. 9, a fastening member 900 includes a body portion 910 generally formed in an "L" shape, a first fastening portion 920 and a second fastening portion 935. The first fastening portion 920 is formed in the shape of a groove in a first side of the body portion 910, and the second fastening portion 935 is formed in the shape of a protrusion on a second side of the body portion 910. The second fastening portion 935 may be formed in a hollow shape, i.e., a pipe shape, or in a hollow cylindrical shape. A coupling portion 315 is formed in a sidewall of a top chassis 300. The coupling portion 315 may be formed in the shape of a through hole.

A protruding portion 240 of a printed circuit board 250 is inserted into the first fastening portion 920 of the fastening member 900. The second fastening portion 935 is inserted in and fixed to the coupling portion 315 of the top chassis 300.

Figure 10:
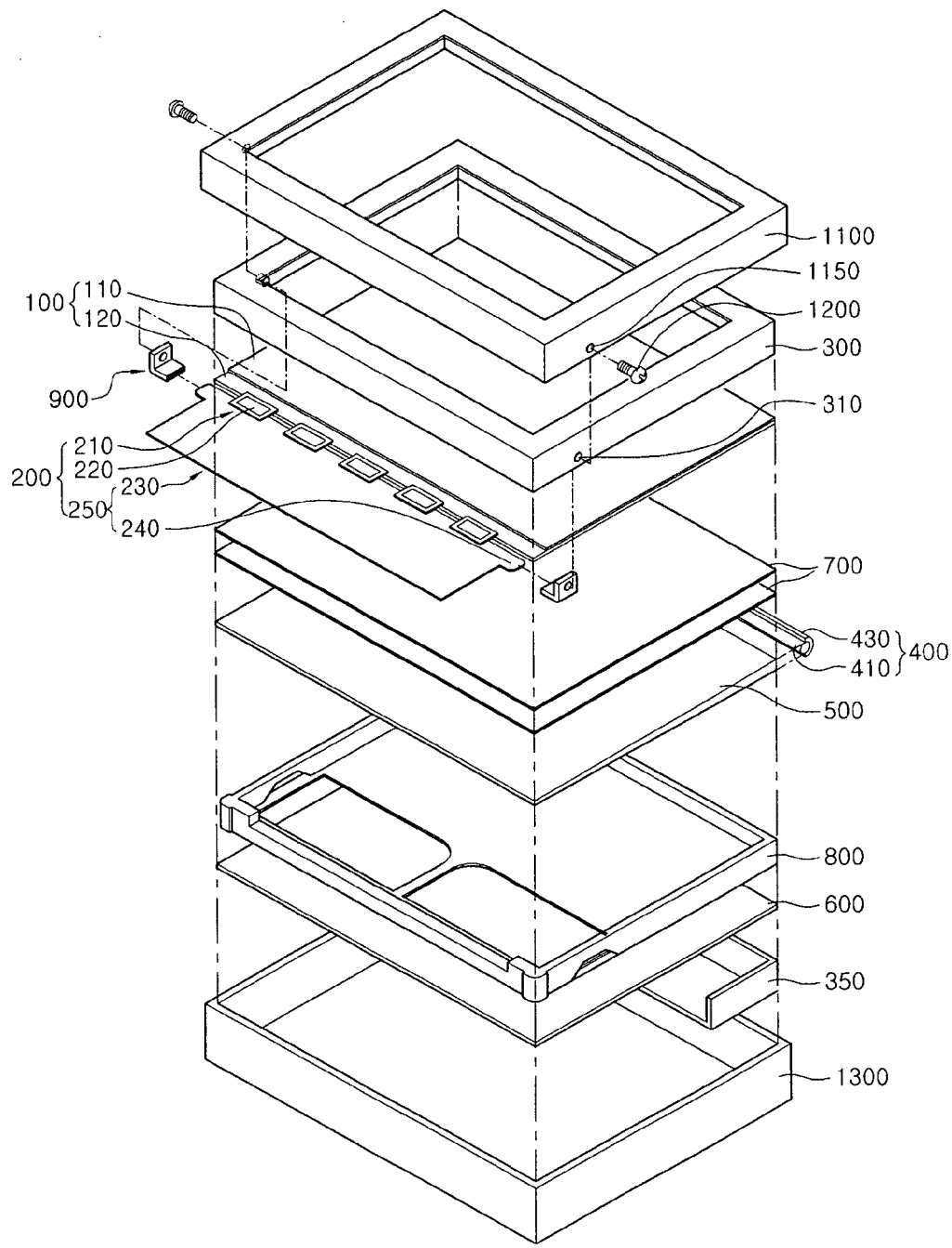
FIG. 10 is a schematic exploded perspective view of a tablet personal computer having the liquid crystal display according to the present invention.

FIG. 10 is a schematic exploded perspective view of a tablet computer having the liquid crystal display according to the present invention.

Referring to FIG. 10, a tablet computer includes a liquid crystal display, a computer main body (not shown), a front case 1100 and a rear case 1300 for receiving the liquid crystal display and the computer main body.

The liquid crystal display includes a liquid crystal display panel 100, a driving circuit unit 200, a top chassis 300, a back cover 350, a lamp unit 400, a light guide plate 500, a digitizer 600, optical sheets 700, a mold frame 800 and fastening members 900.

Coupling portions 310 are formed in the top chassis 300. Each coupling portion 310 is formed as a protrusion, protruding inwardly into the space in which the liquid display panel is accommodated, and a hole 312, as shown in FIG. 6A, extending into the protrusion from the outer surface of the top chassis. A printed circuit board 250 of the driving circuit unit 200 includes a base plate 230, on which circuit components (not shown) are mounted, and protruding portions 240 formed in both sides of the base plate 230.

First fastening portions 920 of the fastening members 900 are fastened to the protruding portions 240 of the printed circuit board 250, and second fastening portions 930 are fastened to protrusions of the coupling portions 310 of the top chassis 300, respectively.

The front case 1100 is disposed over the top chassis 300 of the liquid crystal display, and the rear case 1300 is disposed under the back cover 350. Like the top chassis 300, the front case 1100 is formed in the shape of a rectangular frame and has fastening holes 1150 formed in side wall portions thereof.

Fixing members 1200 are inserted into the fastening holes 1150 formed in the front case 1100 and the holes 312 of the coupling portions 310 of the top chassis 300 to fasten the front case to the top chassis, and thereby fasten the liquid crystal display to the front case. Although a screw or the like may be used as the fixing member 1200, the present invention is not limited thereto.

According to the present invention as described above, a printed circuit substrate is fixed by means of fastening members made of non-conductive elastic material, so that contact between the fastening members and a digitizer will not result in malfunction of the digitizer. In addition, the fastening members absorb shocks and vibrations and thus decrease the possibility that the printed circuit board will be damaged by externally applied shocks and vibrations.

In addition, a tablet computer can be easily assembled, thereby being made ultra-thin in a simplified manner.

The above descriptions are merely exemplary embodiments of a liquid crystal display and a tablet computer having the same according to the present invention, so that the present invention is not limited thereto. The true scope of the present invention should be defined to the extent that those skilled in the art can make various modifications and changes thereto without departing from the scope of the invention, as defined by the appended claims.

What is claimed is:

1. A liquid crystal display, comprising:
a liquid crystal display panel for displaying an image;
a driving circuit unit connected to the liquid crystal display panel and comprising a printed circuit board having a circuit component mounted on the printed circuit board;
a top chassis disposed over the liquid crystal display panel and comprising a coupling portion;
a fastening member for fastening the printed circuit board of the driving circuit unit to the top chassis,
a light source unit for providing light to the liquid crystal display panel;
a digitizer for inputting location coordinates; and
a mold frame having first and second receiving spaces formed therein, the liquid crystal display panel and the light source unit being accommodated in the first receiving space, and the digitizer and the printed circuit board being accommodated in the second receiving space, wherein the fastening member comprises a body portion having a first fastening portion formed therein, wherein the printed circuit board comprises a base plate on which the circuit component is mounted and a protruding portion formed on a side of the base plate, wherein the first fastening portion of the fastening member includes a groove that is configured to receive the protruding portion of the printed circuit board, and wherein the digitizer is disposed between the mold frame and the printed circuit board wherein the fastening member is made of a non-conductive elastic material.

2. The liquid crystal display as claimed in claim 1, wherein the driving circuit unit further comprises a flexible printed circuit board for connecting the printed circuit board and the liquid crystal display panel, wherein the flexible printed circuit board is bent and having a portion facing an end of the digitizer.

3. The liquid crystal display as claimed in claim 1, wherein the fastening member further comprises:
a second fastening portion formed in the body portion to be spaced apart from the first fastening portion.

4. The liquid crystal display as claimed in claim 1, wherein the first fastening portion is fastened to the protruding portion of the printed circuit board and the second fastening portion is fastened to the coupling portion of the top chassis.

5. The liquid crystal display as claimed in claim 3, wherein the second fastening portion is formed in the shape of a groove or through-hole, and the coupling portion of the top chassis is formed in the shape of a protrusion.

6. The liquid crystal display as claimed in claim 5, wherein the coupling portion of the top chassis is formed in the shape of a protrusion with a hole formed in each end of the protrusion.

7. The liquid crystal display as claimed in claim 4, wherein the first fastening portion of the fastening member is formed in the shape of a groove, the second fastening portion is formed in the shape of a protrusion, and the coupling portion of the top chassis is formed in the shape of a through hole.

8. The liquid crystal display as claimed in claim 4, wherein the first fastening portion of the fastening member is formed in the shape of a groove, the second fastening portion is formed in the shape of a groove or through hole, and the coupling portion of the top chassis is formed in the shape of a through hole, the liquid crystal display further comprising a fixing portion to be inserted into the second fastening portion and the coupling portion and to be fixed thereto.

9. The liquid crystal display as claimed in claim 3, wherein the body portion of the fastening member comprises a first body and a second body bent from the first body, the first fastening portion is formed in the first body, and the second fastening portion is formed in the second body.

10. A tablet computer, comprising:
a liquid crystal display including:
a liquid crystal display panel for displaying an image,
a driving circuit unit connected to the liquid crystal display panel and including a printed circuit board with a circuit component mounted thereon,
a top chassis disposed over the liquid crystal display panel and comprising a coupling portion,
a fastening member for fastening the printed circuit board of the driving circuit unit to the top chassis,
a light source unit for providing light to the liquid crystal display panel,
a digitizer for inputting location coordinates, and
a mold frame having first and second receiving spaces formed therein,
wherein the liquid crystal display panel and the light source unit are accommodated in the first receiving space, and the digitizer and the printed circuit board are accommodated in the second receiving space;
a case for receiving the liquid crystal display; and
a fixing member for fixing the top chassis of the liquid crystal display to the case,
wherein the fastening member comprises a body portion having a first fastening portion formed therein,
wherein the printed circuit board comprises a base plate on which the circuit component is mounted and a protruding portion formed on a side of the base plate,
wherein the first fastening portion of the fastening member includes a groove that is configured to receive the protruding portion of the printed circuit board, and
wherein the digitizer is disposed between the mold frame and the printed circuit board wherein the fastening member is made of a non-conductive elastic material.

11. The tablet computer as claimed in claim 10, wherein the fastening member is fastened to the coupling portion of the top chassis and the protruding portion of the printed circuit board.

12. The tablet computer as claimed in claim 10, wherein the fastening member includes a body portion, a first fastening portion formed in the body portion, and a second fastening portion formed in the body portion to be spaced apart from the first fastening portion; and the first fastening portion is fastened to the protruding portion of the printed circuit board and the second fastening portion is fastened to the coupling portion of the top chassis.

13. The tablet computer as claimed in claim 12, wherein the coupling portion of the top chassis is formed in the shape of a protrusion with a hole formed in each of the protrusion, the front case has a fastening hole formed therein, and the fixing member is inserted in the fastening hole of the case and the coupling portion of the top chassis.

* * * * *